United States Patent
Numajiri

(10) Patent No.: US 8,178,988 B2
(45) Date of Patent: May 15, 2012

(54) DIRECT-DRIVE WIND TURBINE GENERATOR AND BEARING STRUCTURE

(75) Inventor: Tomohiro Numajiri, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/805,659

(22) Filed: Aug. 12, 2010

(65) Prior Publication Data
US 2011/0266806 A1 Nov. 3, 2011

Related U.S. Application Data

(63) Continuation of application No. PCT/JP2010/057613, filed on Apr. 28, 2010.

(51) Int. Cl.
*F03D 9/00* (2006.01)
*H02P 9/04* (2006.01)

(52) U.S. Cl. .......................................... 290/44; 384/583

(58) Field of Classification Search ................ 290/44, 290/55; 415/229, 2.1, 4.2, 4.5; 384/583, 384/493, 504, 517, 519, 557, 559, 563
See application file for complete search history.

(56) References Cited

U.S. PATENT DOCUMENTS

| | | | | | |
|---|---|---|---|---|---|
| 2,314,622 | A | * | 3/1943 | Klamp | 384/563 |
| 3,144,283 | A | * | 8/1964 | Gamet | 384/563 |
| 3,398,999 | A | * | 8/1968 | Halvorsen | 384/45 |
| 6,911,741 | B2 | | 6/2005 | Pettersen et al. | |
| 7,642,668 | B2 | * | 1/2010 | Kim et al. | 290/55 |
| 2002/0049108 | A1 | * | 4/2002 | Hosle | 475/3 |
| 2002/0114551 | A1 | * | 8/2002 | Andren et al. | 384/537 |
| 2008/0187265 | A1 | * | 8/2008 | Koda et al. | 384/563 |
| 2009/0015020 | A1 | * | 1/2009 | Stiesdal | 290/55 |
| 2010/0074753 | A1 | | 3/2010 | Berger et al. | |

FOREIGN PATENT DOCUMENTS

| | | |
|---|---|---|
| JP | 2006-177268 A | 7/2006 |
| JP | 2005-240978 | 4/2010 |

* cited by examiner

*Primary Examiner* — Julio Gonzalez
(74) *Attorney, Agent, or Firm* — Manabu Kanesaka; Kenneth M. Berner; Benjamin J. Hauptman

(57) ABSTRACT

A direct-drive wind turbine generator is provided with: a main shaft having one end connected to a rotor head of a wind turbine rotor; a generator having a stator, a stator casing for supporting the stator, and a rotor connected to the other end of the main shaft; first and second bearings positioned between the rotor head and the generator to rotatably support the main shaft; and a torque support for supporting the stator casing. The second bearing is positioned closer to the generator than the first bearing. The first bearing is a bearing with an aligning capability, and the second bearing is a bearing with no aligning capability.

8 Claims, 10 Drawing Sheets

24: TORQUE SUPPORT MEMBER

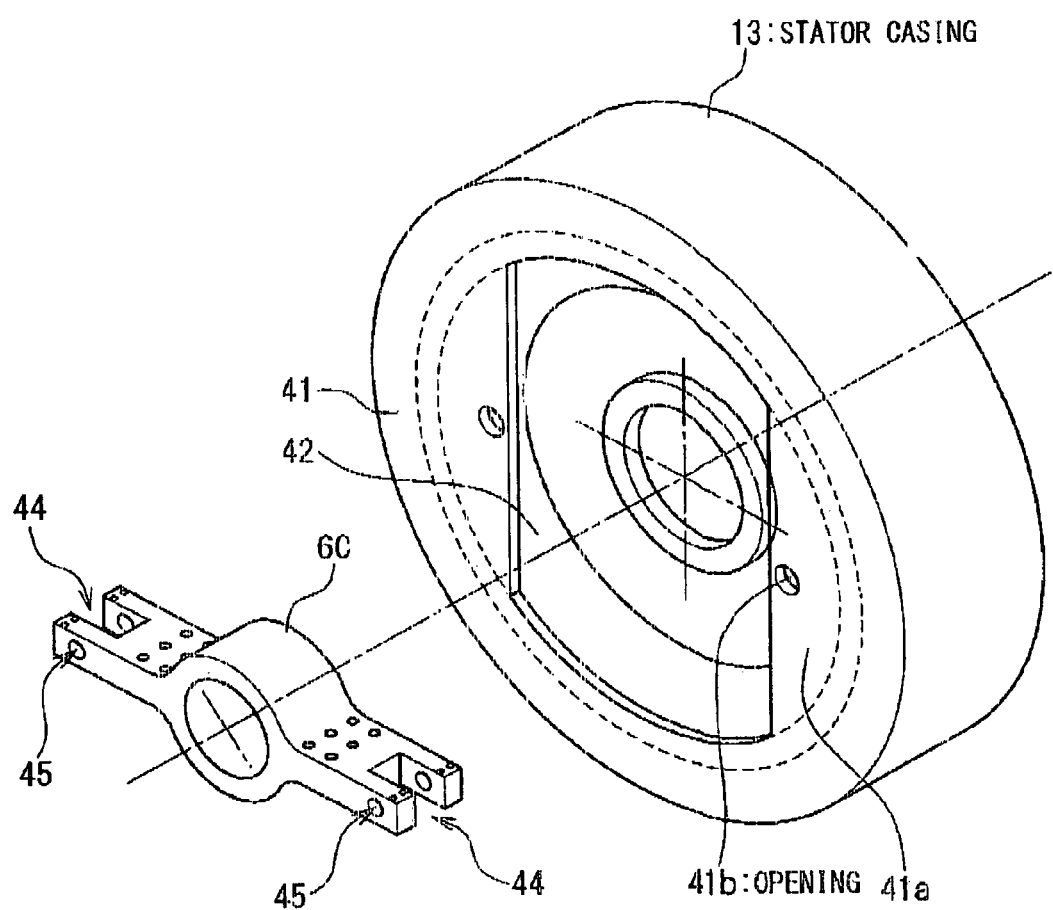

DIRECT-DRIVE WIND TURBINE GENERATOR AND BEARING STRUCTURE

CROSS-REFERENCE TO RELATED APPLICATION

This is a continuation application of International Application No. PCT/JP2010/057613, filed on Apr. 28, 2010.

BACKGROUND OF THE INVENTION

1. Field of the Invention

The present invention relates to a direct-drive wind turbine generator and bearing structure suitable for the direct-drive wind turbine generator, and in particular, relates to a structure for supporting a main shaft and a generator in a direct-drive wind turbine generator.

2. Description of the Related Art

One known form of wind turbine generators is the direct-drive wind turbine generator. In a direct-drive wind turbine generator, a wind turbine rotor and a generator are directly connected by a main shaft, while the rotation of the wind turbine rotor is transmitted to the electric generator by a speed-up gear with the number of rotations increased in a geared wind turbine generator.

A direct-drive wind turbine generator requires special consideration in designing the structure for supporting the main shaft and the generator, because the size of the generator is large due to the use of a synchronous generator, and the generator and the main shaft are directly connected. In general, the main shaft is rotatably supported with two bearings, and a structure for preventing rotations of the stator casing of the generator is provided. Hereinafter, the structure for preventing rotations of the stator casing of the generator is referred to as torque support. Due to rotations of the main shaft, a torque is applied to the stator casing of the generator in the circumferential direction of the main shaft. It is a role of the torque support to support the stator casing so that that the stator casing does not rotate even when a torque is applied. One or two generator bearings may be additionally provided between the main shaft and the stator casing to support the stator casing thereby. A structure for rotatably supporting the main shaft with two bearings and supporting the stator casing with a torque support is disclosed in European Patent Application No. EP1327073 B1 (Patent Document 1), European Patent Application No. EP2014917 A1 (Patent Document 2) and corresponding Japanese Patent Application Publication P2009-019625A (Patent Document 3), and International Publication WO2007/111425 (Patent Document 4), for example.

Here, bearings with the aligning capability (bearings that allows flexing and tilting of the shaft) are used in general, as bearings which support the main shaft of a wind turbine generator. This is considered to be based on a technical idea that flexing of the main shaft is generated in a direct-drive wind turbine generator and the flexing needs to be absorbed. For example, EP1327073 B1 discloses that bearings for supporting the main shaft allow flexing of the main shaft (e.g. Claim 1). Additionally, International Publication WO2007/111425 discloses that a toroidal roller bearing is employed as a bearing near the rotor head and that a spherical roller bearing is employed as a bearing near the generator, hence compensating the misalignment and tilting of the main shaft.

According to a study by the inventor of the present invention, however, the structure which supports a main shaft with two bearings having the aligning capability and further supports the stator casing with a torque support is not appropriate in order to keep the gap between the stator and rotor constant. FIG. 8 shows the reason. Considered in the following description is a structure which supports a main shaft 103 with first and second bearings 101 and 102, and supports the torque working on a stator casing 106 of a generator 105 in the circumferential direction of the main shaft with a torque support 104, as shown in FIG. 3. Here, $l_1$ is the distance between the load point on the side of the rotor head and the first bearing 101; $l_2$ is the distance between the first bearing 101 and the second bearing 102; and $l_3$ is the distance between the second bearing 102 and a point at which force works from the torque support 104 to the stator casing 106. Additionally, $R_1$ and $R_2$ are the support reaction forces applied by the first bearing 101 and the second bearing 102, and $R_3$ is the support reaction force applied to the stator casing 106 by the torque support 104.

When the two bearings (the first bearing 101 and the second bearing 102) for supporting the main shaft 103 both has an aligning capability, angles of flexure $\gamma_1$ and $\gamma_2$ are caused at the respective positions thereof. Due to the angle of flexure $\gamma_2$ and the distance $l_3$, which is inevitably present because of the layout of the wind turbine generator, the support reaction force $R_3$ is caused even when no torque is worked on the torque support 104. Here, the magnitude of the support reaction force $R_3$ is the product of the spring constant of the torque support 104 times the strain $\delta$.

The support reaction force $R_3$ is not preferable, since an unbalance of the gap between the stator and rotor of the generator 105 is caused. When a permanent magnet synchronous generator (PMSG) is used as the generator 105, in particular, the problem of the unbalance of the gap is significant. In detail, a permanent magnet synchronous generator (PMSG), in which magnetic attractive forces of field magnets and various electric forces work, requires surely keeping the gap between the stator and rotor and reducing various vibration mode displacements. Due to the support reaction force $R_3$, however, the stator casing 106 is displaced correspondingly to the internal clearance of the generator bearing and the stator casing 106 itself is slightly deformed. As a result of the displacement corresponding to the internal clearance and the deformation, an unbalance of the gap between the stator and rotor is caused, and mode vibration due to bending is caused in addition to the magnetic vibration caused by the rotation. Occurrence of a bending mode vibration is not preferable in view of an increase in the vibration of the wind turbine generator. Additionally, occurrence of bending mode vibration increases fatigue loads and causes a problem that structural members (e.g. the main shaft 103, the torque support 104, and the stator casing 106) need to be designed to have a high strength, resulting in the increase of the weight.

SUMMARY OF THE INVENTION

Therefore, an object of the present invention is to provide a technique for preventing the unbalance of the gap between the stator and rotor of an electric generator in a direct-drive wind turbine generator.

In an aspect of the present invention, a direct-drive wind turbine generator is provided with: a main shaft heaving one end connected to a rotor head of a wind turbine rotor; a generator including a stator, a stator casing for supporting the stator, and a rotor connected to the other end of the main shaft; first and second bearings positioned between the rotor head and the generator to rotatably support the main shaft; and a torque support for supporting the stator casing. The first bearing is a bearing with an aligning capability, and the second bearing, which is positioned closer to the generator than the first bearing, is a bearing with no aligning capability. A double taper roller bearing may be used as the second bearing. Additionally, a tapered roller bearing, a cylindrical roller bearing, and a spherical roller bearing may be used as the first bearing, for example.

In one embodiment, the second bearing includes first and second inner rings, first and second outer rings, first rolling elements provided between the first inner ring and the first outer ring, second rolling elements provided between the second inner ring and the second outer ring, and a biasing member. The distance between the second outer ring and the second inner ring is variable, and the biasing member biases the second outer ring so that the inner face of the second outer ring comes close to the outer face of the second inner ring.

In the direct-drive wind turbine generator, it is preferable that the second bearing is movable with respect to a bearing housing which houses and supports the second bearing, and the bearing housing and the second outer ring are coupled through a line contact or a point contact. In this case, for example, a cylindrical roller may be inserted between the bearing housing and the second outer ring.

Additionally, it is also preferable that the second bearing further includes a third inner ring, a third outer ring, and a third roller element provided between the third inner ring and the third outer ring.

It is preferable that the stator casing have a concave on an opposing face positioned opposed to the bearing housing which houses and supports the second bearing, and that an end of the bearing housing is on the same plane with the opposing face or that a part of the bearing housing is positioned inside the concave.

Additionally, it is also preferable when the torque support has a torque support member connected to the bearing housing which houses and supports the second bearing, that the torque support member connects the bearing housing and the stator casing in the radial direction of the main shaft.

The stator casing may have a center plate which is opposed to the bearing housing, and an outer circumferential plate connected to an outer edge portion of the center plate. In this case, the center plate may be structured so that the center portion thereof is depressed from the outer edge portion to provide the stator casing with a concave, and that the outer circumferential plate is structured to form a protruding portion which protrudes from the outer edge of the concave portion in the radially inward direction of the main shaft and functions as a torque support. In this case, a part of the bearing housing is housed in the concave and the protruding portion is fitted into a groove provided for the bearing housing, hence connecting the stator casing and the bearing stand.

In another aspect of the present invention, a bearing structure includes first and second inner rings, first and second outer rings, first rolling elements provided between the first inner ring and the first outer ring, second rolling elements provided between the second inner ring and the second outer ring, and a biasing member. The distance between the second outer ring and the second inner ring is variable, and the biasing member biases the second outer ring so that the inner face of the second outer ring comes close to the outer face of the second inner ring.

The present invention prevents an unbalance of the gap between the stator and rotor of an electric generator in a direct-drive wind turbine generator.

BRIEF DESCRIPTION OF THE DRAWINGS

FIG. 7A is a perspective view showing a configuration of a wind, turbine generator in one embodiment of the present invention;

DESCRIPTION OF THE PREFERRED EMBODIMENTS

Figure 1:
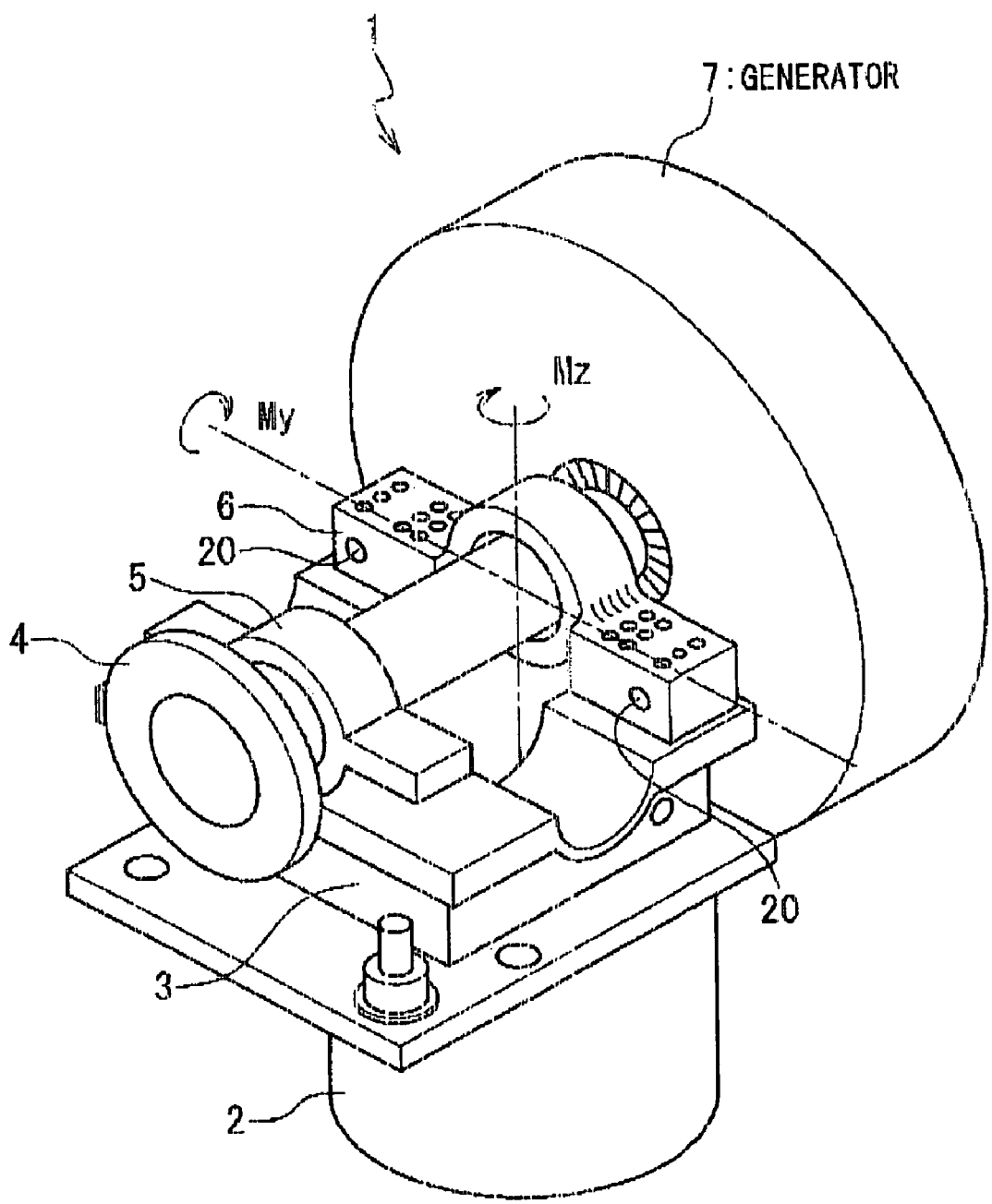
FIG. 1 is a perspective view showing the configuration of a wind turbine generator in one embodiment of the present invention.

FIG. 1 is a perspective view schematically showing the configuration of a wind turbine generator 1 in one embodiment of the present invention. The wind turbine generator 1 of this embodiment is structured as a direct-drive wind turbine generator, and has the following configuration: The wind turbine generator 1 is provided with a tower 2 and a nacelle base 3. The nacelle base 3 is placed at the top of the tower 2 so as to allow the yaw rotation. First and second bearing housings 5 and 6 are disposed on the nacelle base 3, and a main shaft 4 is rotatably supported by first and second bearings 8 and 9 (see FIG. 2) provided in the first and second bearing housings 5 and 6, respectively. One end of the main shaft 4 is connected to a rotor head (not shown) of a wind turbine rotor, and the other end is connected to a generator 7. The generator 7 is further connected to the second bearing housing 6 by a torque support 20.

Figure 2:
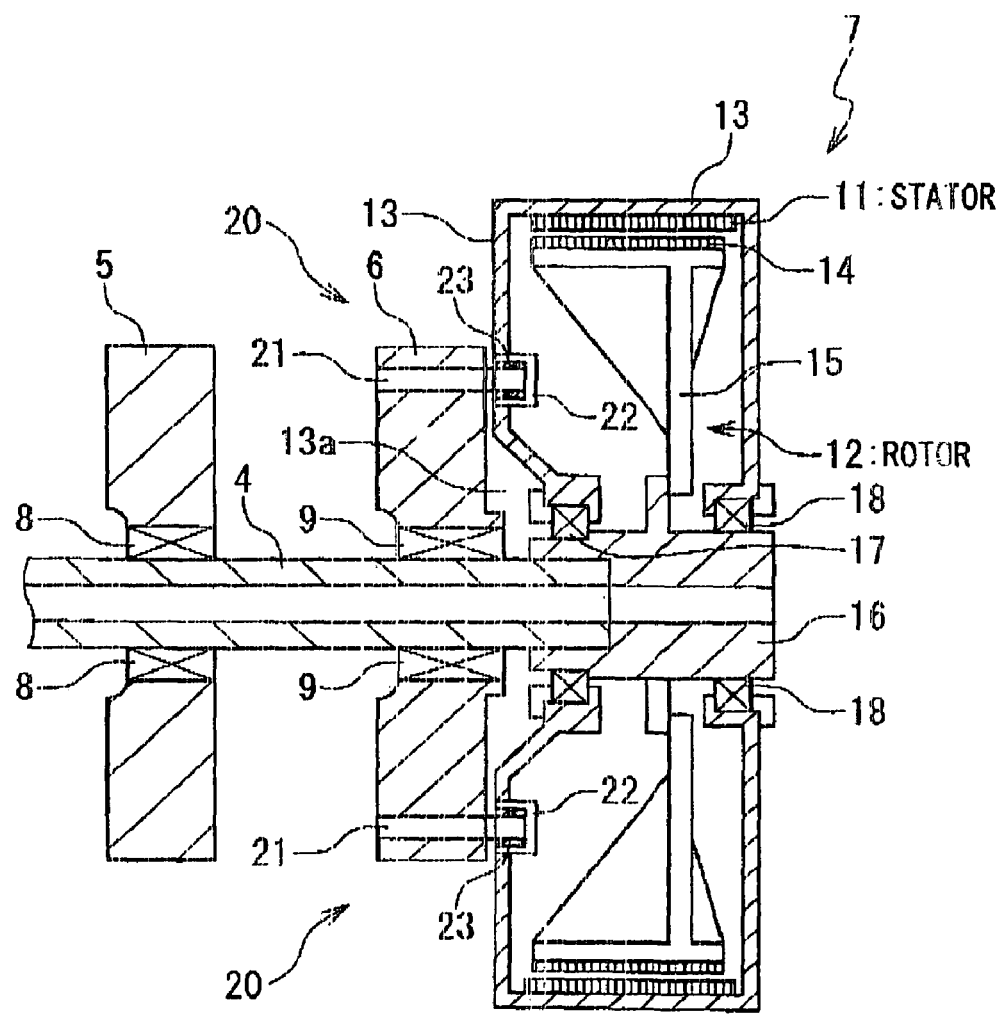
FIG. 2 is a sectional view showing the configuration of the wind, turbine generator shown in FIG. 1.

FIG. 2 is a sectional view of the wind turbine generator 1 of this embodiment, seen from above. The generator 7 has a stator 11 and a rotor 12. The stator 11 is supported by a stator casing 13. On the other hand, the rotor 12 includes field magnets 14 opposed to the stator 11, and a rotor plate 15 which supports the field magnets 14. The rotor plate 15 is connected to a sleeve 16 which is connected to an end of the main shaft 4, and thereby the rotor 12 is connected to the main shaft 4. Although the sleeve 16 is connected to an end of the main shaft 4 in the present embodiment, the sleeve 16 and the main shaft 4 may be formed continuously or integrated as one unit.

The sleeve 16 is provided with generator bearings 17 and 18, and the stator casing 13 is supported by the generator bearings 17 and 18. Supporting the stator casing 13 with the generator bearings 17 and 18 provided on the main shaft 4 is effective for keeping the gap between the stator 11 and the rotor 12 constant.

The torque support 20 connects the stator casing 13 and the second bearing housing 6. In this embodiment, the torque support 20 includes a pin 21, a sleeve 22, and a rubber bush 23. The sleeve 22 is fixed to the stator casing 13, and the rubber bush 23 is inserted into the sleeve 22. Additionally, the pin 21 is inserted into the rubber bush 23, and the pin 21 is fixed to the second bearing housing 6. The torque working on the stator casing 13 in the circumferential direction of the main shaft 4 is supported with the torque support 20 having the above-described configuration.

As mentioned above, the structure in which the main shaft is supported by two bearings having the aligning capability and the stator casing is supported by the torque support has a problem of occurrence of the unbalance of the gap between the stator and rotor of the generator. In order to address this problem, the wind turbine generator 1 of this embodiment employs a bearing with no aligning capability, namely, a bearing that does not allow tilting of the main shaft 4, as the second bearing 9, which is a bearing closer to the generator 7. On the other hand, a bearing with the aligning capability is used for the first bearing 8. More specifically, a tapered roller bearing, a cylindrical roller bearing, or a spherical bearing is used as the first bearing 8, for example. On the other hand, a double taper roller bearing is used as the second bearing 9, for example.

Figure 3:
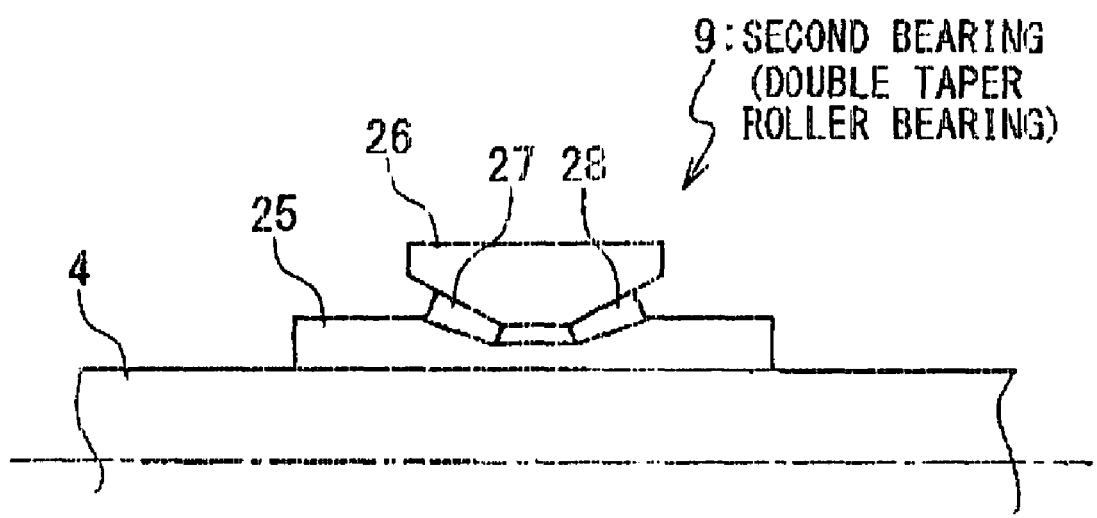
FIG. 3 is a sectional view showing an example of the configuration of a second bearing, which is positioned closer to the generator.

FIG. 3 is a sectional view showing an example of the configuration of the second bearing 9. The second bearing 9 is provided with an inner ring 25, an outer ring 26, and toroidal rollers 27 and 28 provided therebetween. Although one toroidal roller 27 and one toroidal roller 28 are shown in FIG. 3, it should be understood that a plurality of toroidal rollers 27 are arranged in a row in the circumferential direction of the main shaft 4, and that a plurality of toroidal rollers 28 are arranged in a row in the circumferential direction of the main shaft 4. The inner ring 25 is attached to the main shaft 4, and the outer ring 26 is attached to the second bearing housing 6. The inner ring 25 has a taper so that a depression is formed at the center portion of the second bearing 9, and the outer ring 26 has a taper such that a convexity is formed at the center portion of the second bearing 9. The toroidal rollers 27 and 28 are arranged to have smaller radii toward the center of the second bearing 9. With the above-described configuration, the second bearing 9 rotatably holds the main shaft 4 without allowing tilting.

The use of a bearing with no aligning capability as the second bearing 9 allows mechanically integrating a portion, of the main shaft 4 closer to the generator 7 than the second bearing 9; the sleeve 16; the rotor 12; and the stator casing 13 in operating the wind turbine generator 1, avoiding occurrence of a relative displacement among these members. In other words, the change in the relative position relationship between the portion of the main shaft 4 closer to the generator 7 than the second bearing 9; the sleeve 16; the rotor 12; and the stator casing 13 is prevented, and these members work as if these members are a single unit as a whole. This is effective in terms of keeping the gap between the stator 11 and the rotor 12 constant and preventing the unbalance of the gap.

Figure 4A:
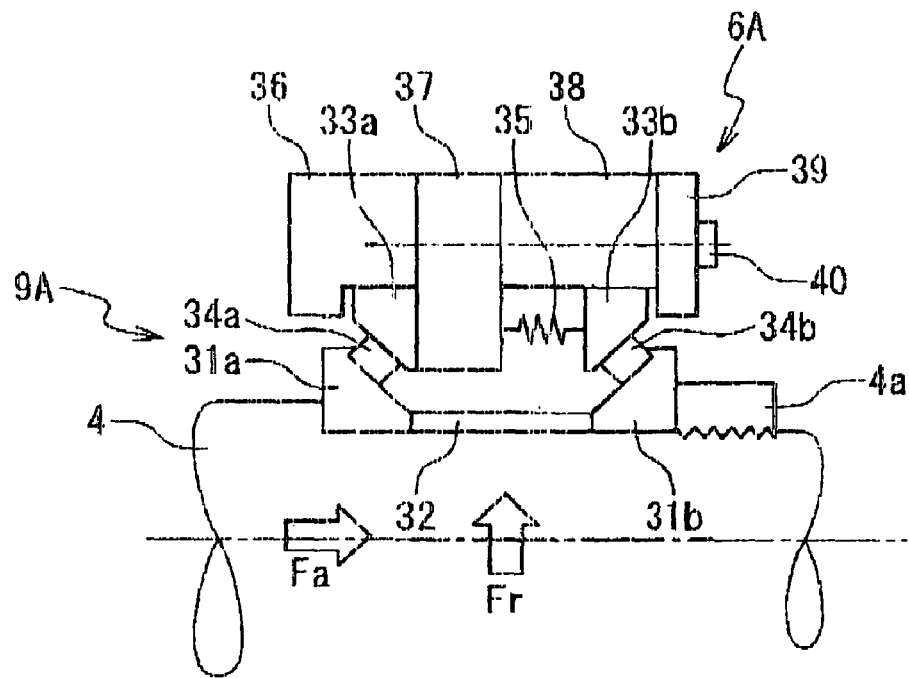
FIG. 4A is a sectional view showing another example of the configuration of the second bearing.

In this embodiment, where a bearing with no aligning capability is used as the second bearing 9, it is preferable that a bearing structure which reduces backlash of the second bearing 9, namely, which reduces the space between rolling elements (balls or rollers) in the second bearing 9 and the inner ring 25 or the outer ring 26, is employed in order to surely keep the gap. FIG. 4A shows an example of the configurations of a second bearing 9A formed to reduce the space and of a second bearing housing 6A for supporting the second bearing 9A.

The second bearing housing 6A has a first annular member 36, an intermediate member 37, a second annular member 38, a hold plate 39, and bolts 40. The intermediate member 37, the second annular member 38, and the hold plate 39 are fixed to the first annular member 36 by the bolts 40.

The second bearing 9A is provided with a first inner ring 31a, a second inner ring 31b, a spacer 32, and a first outer ring 33a, a second outer ring 33b, a spring 35, and toroidal rollers 34a and 34b. The first inner ring 31a, the second inner ring 31b, and the spacer 32 are inserted onto the main shaft 4 and fixed to the main shaft 4 by a nut 4a. The spacer 32 has a function to keep a desired distance between the first inner ring 31a and the second inner ring 31b. The first inner ring 33a is held between the first annular member 36 and the intermediate member 37. The second outer ring 33b is held by being pressed against the inner face of the second annular member 38. Here, the second outer ring 33b is slidable in the axial direction of the main shaft 4.

The toroidal rollers 34a are inserted between the first inner ring 31a and the first outer ring 33a, and the toroidal rollers 34b are inserted between the second inner ring 31b and the second outer ring 33b. Here, although one toroidal roller 34a and one toroidal roller 34b are shown in FIG. 4A, it should be understood that a plurality of toroidal rollers 34a are arranged in a row in the circumferential direction of the main shaft 4, and that a plurality of toroidal rollers 34b are arranged in a row in the circumferential direction of the main shaft 4.

The first inner ring 31a applies loads to the toroidal rollers 34a in a radially outward direction toward the generator 7, which direction is slanting with respect to the axial direction of the main shaft 4. The second inner ring 31b applies loads to the toroidal rollers 34b in a radially outward direction toward the rotor head, which direction is slanting concerning the axial direction of the main shaft 4. The first outer ring 33a applies loads to the toroidal rollers 34a in a radially inward direction toward the rotor head, which direction is slanting with respect to the axial direction of the main shaft 4. The second outer ring 33b applies loads to the toroidal rollers 34b in a radially inward direction toward the generator 7, which direction is slanting with respect to the axial direction of the main shaft 4. The above-described configuration supports the axial load Fa and the radial load Fr which work on the main shaft 4.

In addition, the spring 35 is inserted between the second outer ring 33b and the intermediate member 37, and the second outer ring 33b is biased in the axial direction of the main shaft 4. Since the outer face of the second inner ring 31b and the inner face of the second outer ring 33b are tilted with respect to the axial direction of the main shaft 4, the spring 35 hence biases the second outer ring 33b so that the inner face of the second outer ring 33b comes close to the outer face of the second inner ring 31b. The action of the spring 35 reduces the backlash of the second bearing 9, namely, the space between the toroidal rollers 34b and the second inner ring 31b, and the space between the toroidal rollers 34b and the second outer ring 33b are reduced. The above-described configuration allows mechanically integrating the portion closer to the generator 7 than the second bearing 9 of the main shaft 4; the sleeve 16; the rotor 12; and the stator casing 13, and effectively prevents occurrence of a relative displacement among these members. This is effective in terms of preventing the unbalance of the gap between the stator 11 and the rotor 12.

The bearing structure shown in FIG. 4A is also effective for improving the uniformity of loads between the toroidal rollers 34a and 34b, and for addressing the problem of the temperature difference between the first and second inner rings 31a and 31b and the first and second outer rings 33a and 33b. In the bearing structure of FIG. 3, one row of toroidal rollers (e.g. the row of the toroidal rollers 28) is burdened with a heavier load when a load is applied in the axial direction of the main shaft 4. This is undesirable, since the life of the second bearing 9 is shortened. Additionally, the rotation of the main shaft 4 causes an increase in the temperature of the second bearing 9, and the increase in temperature is greater in the inner ring 25 than in the outer ring 26. When the temperature of the inner ring 25 is relatively higher than the temperature of the outer ring 26, the thermal expansion of the inner ring 25 is greater than that of the outer ring 26, and consequently mechanical loads on the toroidal rollers 27 and 28 are increased. This is undesirable, since the lives of the toroidal rollers 27 and 28 are shortened.

As for the configuration in FIG. 4, on the other hand, the load Fa equally works on the toroidal rollers 34a and 34b due to the action of the spring 35, when the load Fa works on the second bearing 9 in the axial direction. Therefore, the reduction of the lifetime due to the heavy load applied to one row of toroidal rollers is prevented. Additionally, in the case of the configuration in FIG. 4A, the thermal expansions of the first inner ring 31a and the second inner ring 31b are absorbed by the spring 35 even when the increase in the temperature of the first and second inner rings 31a and 31b are greater than that of the first and second outer rings 33a and 33b. Therefore, the configuration in FIG. 4 can avoid the problem of temperature difference between the first and second inner rings 31a, and 31b, and the first and second outer rings 33a and 33b.

Figure 4B:
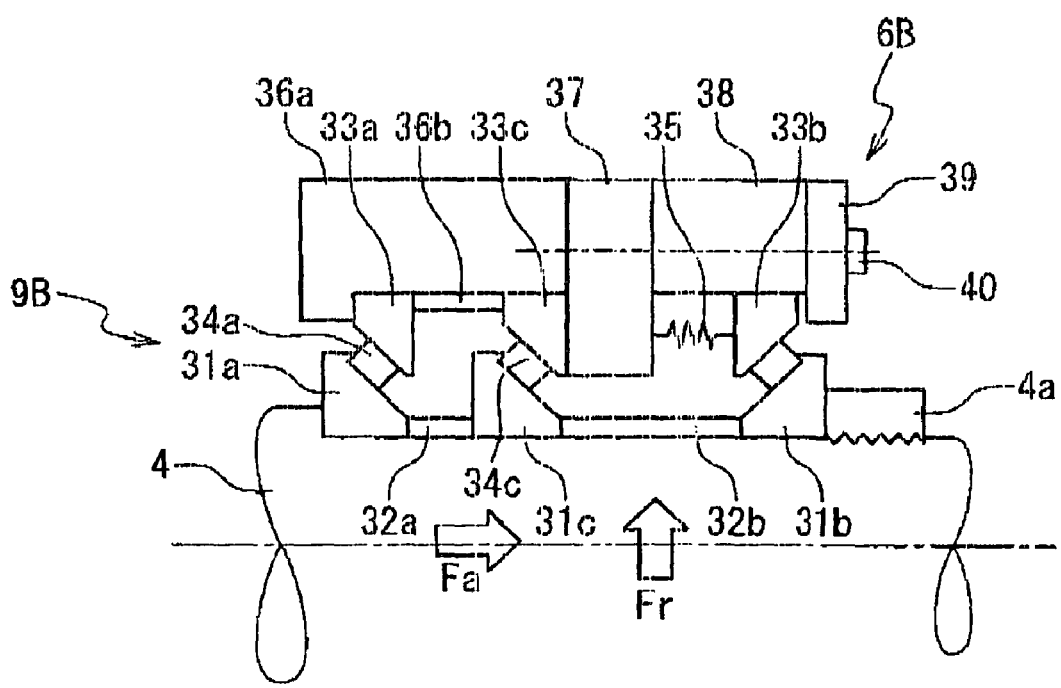
FIG. 4B is a sectional view showing still another example of the configuration of the second bearing.

To further reduce the displacement of the main shaft 4, three rows of toroidal rollers may be provided as shown in FIG. 4B. In the configuration of the second bearing 9B in FIG. 4B, a third inner ring 31c and a third outer ring 33c are additionally provided, and toroidal rollers 34c are provided therebetween. A spacer 32a is provided between the first inner ring 31a and the third inner ring 31c while a spacer 32b is provided between the second inner ring 31b and the third inner ring 31c, hence keeping a desired space between the first inner ring 31a and the third inner ring 31c and a desired space between the second inner ring 31b and the third inner ring 31c. Additionally, the first outer ring 33a and the third outer ring 33c are held between the first annular member 36a and the intermediate member 37. Here, a spacer 36b is inserted between the first outer ring 33a and the third outer ring 33c, to keep a desired space between the first outer ring 33a and the third outer ring 33c.

It should be noted that balls may be used as rolling elements instead of the toroidal roller 34a, 34b, and 34c, in the configuration of FIG. 4B in which three rows of rolling elements are provided. The use of balls as rolling elements is preferable in terms of cost reduction.

In the configurations of FIGS. 4A and 4B, the second outer ring 33b must be slidable in the axial direction on the inner face of the second annular member 38. When the size of the second annular member 38 is increased, manufacturing errors of the second annular member 38 are also increased and this may make it difficult to allow the second outer ring 33b to slide on the inner face of the second annular member 38.

In order to allow the second outer ring 33b to move on the second annular member 38, it is preferable that the contact between the second outer ring 33b and the second annular member 38 is a line contact or a point contact (not a face contact). This reduces the friction between the second outer ring 33b and the second annular member 38, allowing the second outer ring 33b to move on the second annular member 38, more easily.

Figure 4C:
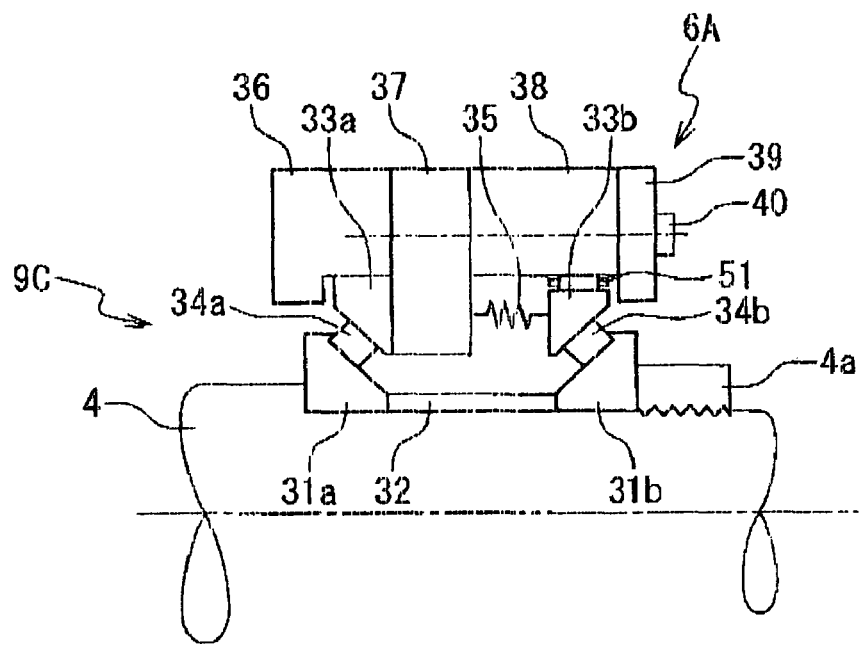
FIG. 4C is a sectional view showing still another example of the configuration of the second bearing.
Figure 4D:
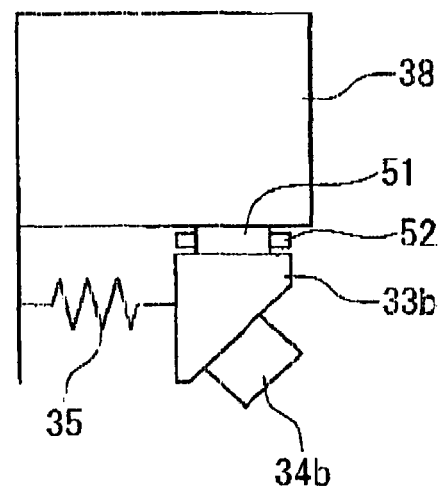
FIG. 4D is a sectional view showing the configuration of the second bearing shown in FIG. 4C in detail.
Figure 4E:
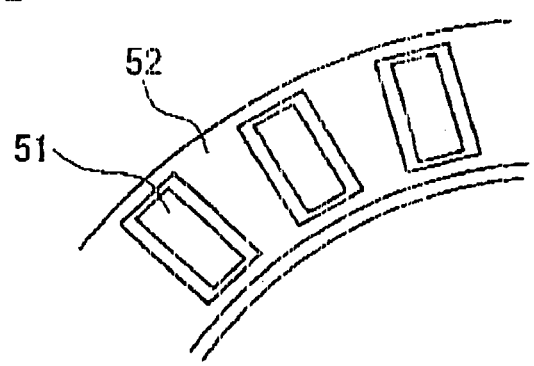
FIG. 4E is a perspective view showing the configuration of this second bearing shown in FIG. 4C in detail.

More specifically, cylindrical rollers 51 may be provided between the second outer ring 33b and the second annular member 38 as shown in FIG. 4C. Although only one cylindrical roller 51 is shown in FIG. 4C, it should be understood in FIG. 4C that a plurality of cylindrical rollers 51 are arranged in a row in the circumferential direction of the main shaft 4. Each of the cylindrical rollers 51 is positioned so that the center axis thereof is parallel to the axial direction of the main shaft 4. As shown in FIGS. 4D and 4E, the cylindrical rollers 51 are retained at desired positions by a retainer 52. As a result of the line contact between the cylindrical rollers 51 and the second annular member 38 and the line contact between the cylindrical rollers 51 and the second outer ring 33b, the second outer ring 33b can move on the second annular member 38, more easily. Although cylindrical rollers are used in FIGS. 4C to 4E, balls may be used instead of cylindrical rollers. Additionally, the structure in which cylindrical rollers or balls are provided between the second outer ring 33b and the second annular member 38 as shown in FIGS. 4C to 4E is also applicable to the structure in which three rows of rolling elements are provided as shown in FIG. 4B.

To further avoid the occurrence of the relative displacement between the portion of the main shaft 4 closer to the generator 7 than the second bearing 9; the sleeve 16; the rotor 12; and the stator casing 13, and further reduce the unbalance of the gap between the stator 11 and the rotor 12, it is preferable to shorten the distance in the axial direction of the main shaft 4 from the position at which force works from the torque support 20 to the stator casing 13, to the second bearing 9.

Figure 5:
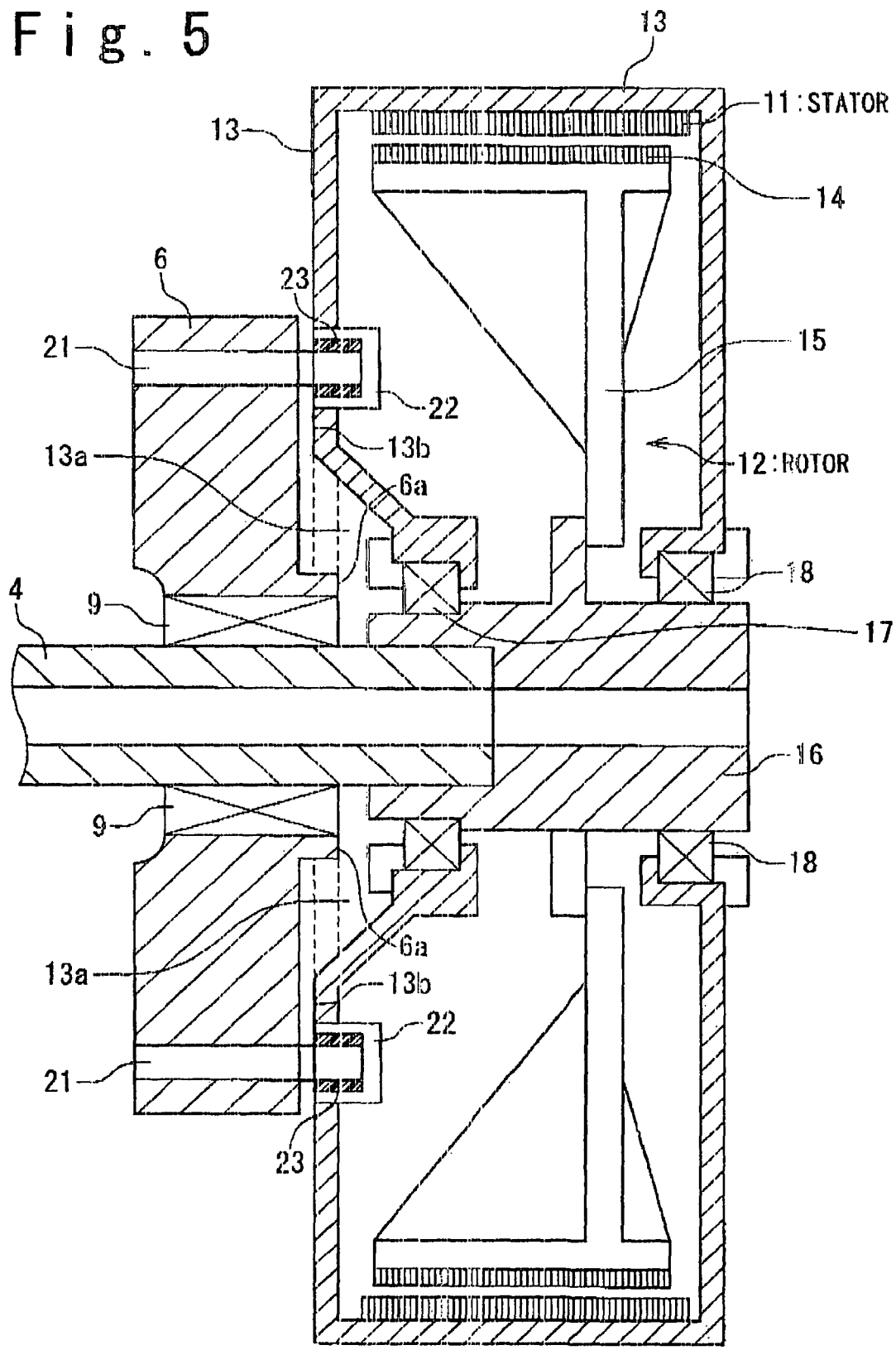
FIG. 5 is an enlarged sectional view showing the configuration of the wind turbine generator shown in FIG. 1.

In order to achieve this, it is preferable that a concave portion 13a is provided for the stator casing 13a and that an end portion 6a of the second bearing housing 6 is positioned inside the concave portion 13a of the stator casing 13, as shown in FIG. 5. In addition, the end portion 6a of the second bearing housing 6 may be on the same plane with an opposing surface 13b of the stator casing 13, which is opposed to the second bearing housing 6. In either case, it is possible to shorten the distance in the axial direction of the main shaft 4 between the position at which force works from the torque support 20 to the stator casing 13, to the second bearing 9.

Figure 6:
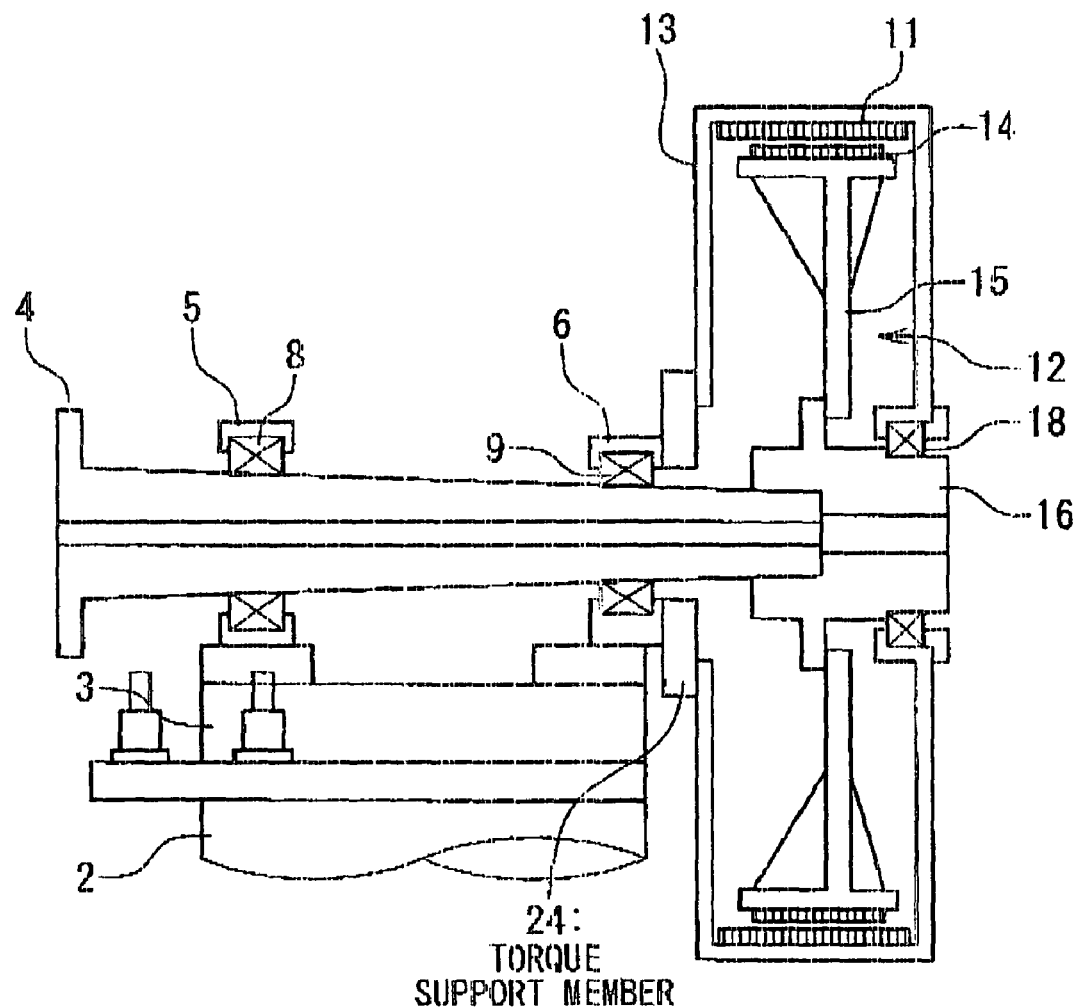
FIG. 6 is a perspective view showing the configuration of a wind turbine generator in another embodiment of the present invention.

FIG. 6 is a sectional view showing another configuration for shortening the distance from the position at which force works from the torque support to the stator casing 13, to the second bearing 9. In the structure of FIG. 6, a disk-shaped torque support member 24 is directly joined to the end portion of the second bearing housing 6, and the stator casing 13 is connected to a peripheral portion of the torque support member 24. An opening is provided at the center of the torque support member 24, and the main shaft 4 is inserted through the opening. It should be noted that, in the structure of FIG. 6, the generator bearing 17 closer to the second bearing 9 is not provided, since the distance between the second bearing 9 and the stator casing 13 is short.

Such configuration enables positioning the position at which force works from the torque support member 24 to the stator causing 13, at the end of the second bearing housing 6. That is to say, the torque support member 24 is formed to extend from the end of the second bearing housing 6 in the radial direction of the main shaft 4 and to be connected with the stator casing 13, hence shortening the distance from the position at which force works from the torque support member 24 to the stator casing 13, to the second bearing 9. This is effective in terms of further prevention of the occurrence of the relative displacement between the portion of the main shaft 4 closer to the generator 7 than the second bearing 9; the sleeve 16; the rotor 12; and the stator casing 13.

Figure 7B:
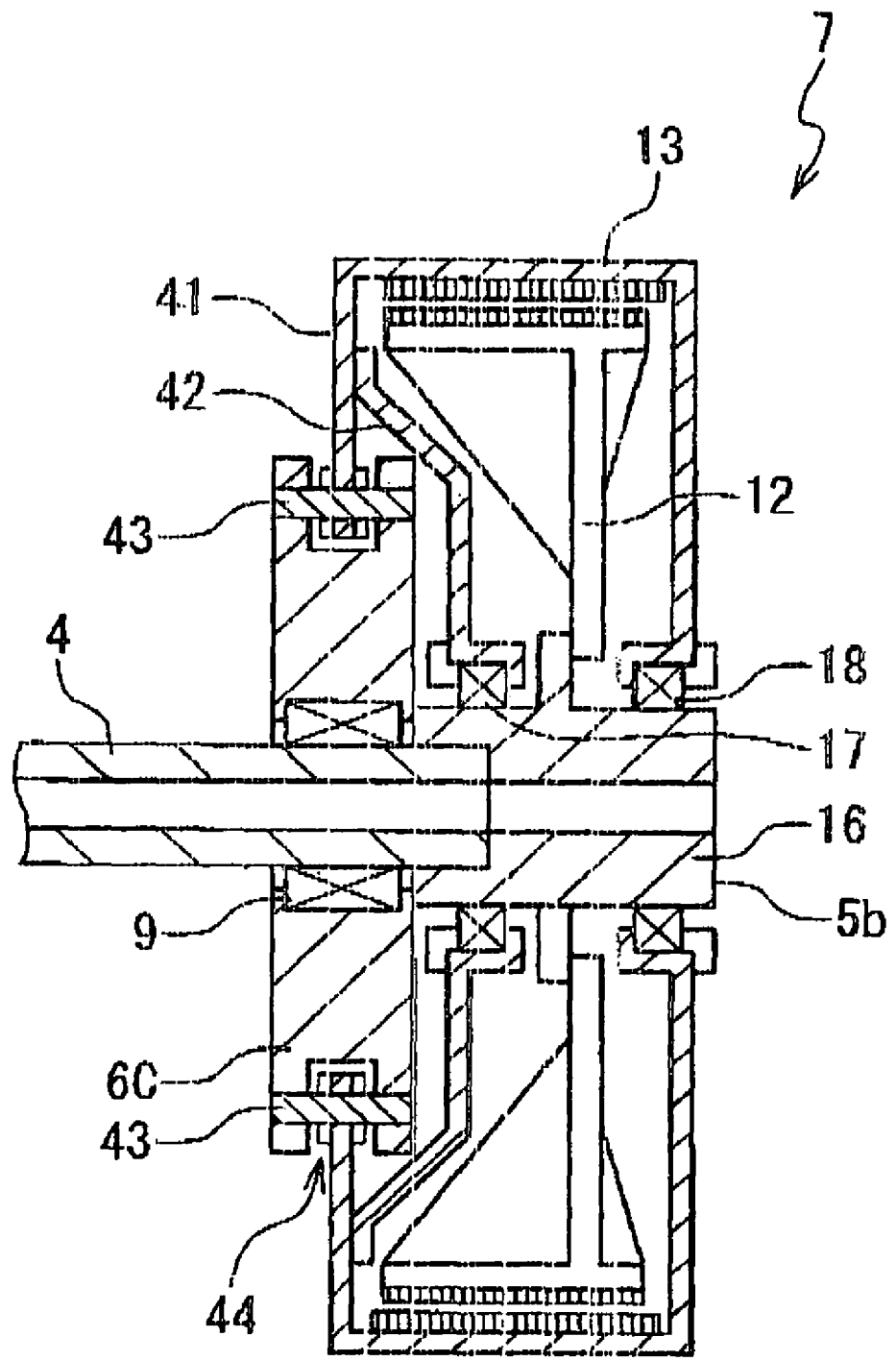
FIG. 7B is a sectional view showing the configuration of the wind turbine generator shown in FIG. 7A.
Figure 8:
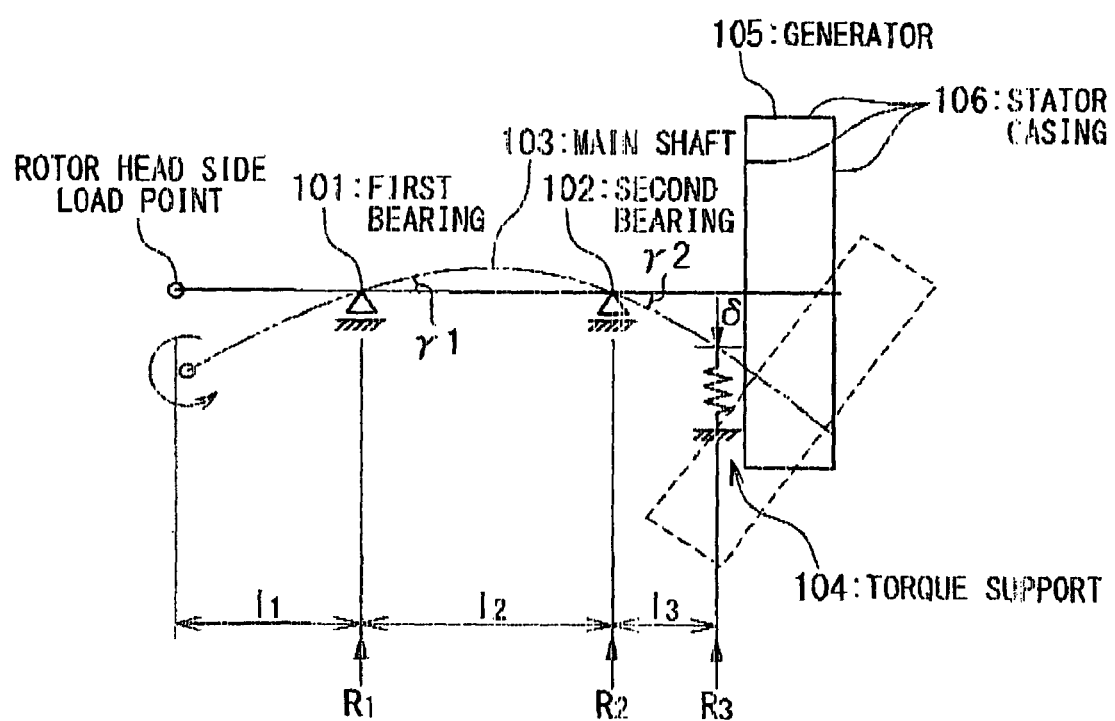
FIG. 8 describes a problem caused when two bearings both have the aligning capability in a direct-drive wind turbine generator.

It would be most ideal that the position at which force works from the torque support 2C to the stator casing 13 is aligned with the center of the second bearing 9. FIGS. 7A and 7B show a configuration which allows aligning the position at which force works from the torque support 20 to the stator casing 13 with the center of the second bearing 9.

In the configurations of FIGS. 7A and 7B, a concave portion is formed in the stator casing 13, and a part of the second bearing housing 6C is housed in the concave portion. In detail, a front plate of the stator casing 13 includes an outer circumferential plate 41 and a center plate 42. The outer circumferential plate 41 is joined to the outer edge portion of the center plate 42. The center plate 42 is depressed at the center portion thereof with respect to the outer edge portion.

In addition, parts of the outer circumferential plate 41 protrude in a radially inward direction from the joint with the center plate 42, and the stator casing 13 is supported by fitting the protruding portions (protruding portions 41a) into grooves 44 of the second bearing housing 6C. That is, the protruding portions 41a of the outer circumferential plate 41 of the stator casing 13 function as a torque support in this embodiment. In detail, the second bearing housing 6C shown in FIG. 7A is provided with the grooves 44 and openings 45 which cross and penetrate the grooves 44 in the axial direction of the main shaft 4. On the other hand, openings 41b are formed through the protruding portions 41a of the outer circumferential plate 41. Pins 43 are inserted into the openings 45 of the second bearing housing 6C with the protruding portions 41a of the outer circumferential plate 41 fitted into the grooves 44 of the second bearing housing 6C. The pins 43 are inserted to penetrate the openings 45 provided through the second bearing housing 6C, and the openings 41b provided through the protruding portions 41a of the outer circumferential plate 41. Consequently, the stator casing 13 is fixed to the second bearing housing 6C.

Since the protruding portions 41a of the outer circumferential plate 41 connect the center portion of the second bearing housing 6C and the stator casing 13 in a radial direction of the main shaft 4, the configuration shown in FIGS. 7A and 7B allows reducing the distance from the position at which force works from the torque support 2C to the stator casing 13, to the center of the second bearing 9 in the axial direction of the main shaft 4, or ideally allows the position at which force works from the torque support 20 to the stator casing 13 to be aligned with the center of the second bearing 9. This is preferable in terms of further prevention of the occurrence of the relative displacement between the portion of the main shaft 4 closer to the generator 7 than the second bearing 9; the sleeve 16; the rotor 12; and the stator casing 13, and further reduction of the unbalance of the gap between the stator 11 and the rotor 12.

What is claimed is:

1. A direct-drive wind turbine generator, comprising:
   a main shaft having one end connected to a rotor head of a wind turbine rotor;
   a generator having a stator, a stator casing for supporting said stator, and a rotor connected to the other end of said main shaft;
   first and second bearings positioned between said rotor head and said generator to rotatably support said main shaft; and
   a torque support for supporting said stator casing,
   wherein said second bearing is positioned closer to said generator than said first bearing and said second bearing includes
   first and second inner rings,
   first and second outer rings,
   first rolling elements provided between said first inner ring and said first outer ring,
   second rolling elements provided between said second inner ring and said second outer ring, and
   a biasing member,
   wherein a distance between said second outer ring and said second inner ring is variable, and
   wherein said biasing member biases said second outer ring so that an inner face of said second outer ring comes close to an outer face of said second inner ring,
   wherein said first bearing is a bearing with an aligning capability, and
   wherein said second bearing is a bearing with no aligning capability.

2. The direct-drive wind turbine generator according to claim 1, wherein said second bearing is a double taper roller bearing.

3. The direct-drive wind turbine generator according to claim 1, wherein said first bearing is a tapered roller bearing, a cylindrical roller bearing, or a spherical bearing.

4. The direct-drive wind turbine generator according to claim 1, wherein said second bearing further includes:
   a third inner ring;
   a third outer ring; and
   third roller elements provided between said third inner ring and said third outer ring.

5. The direct-drive wind turbine generator according to claim 1, further comprising: a bearing housing which houses and supports said second bearing,
   wherein said stator casing includes a concave on an opposing face opposed to said bearing housing, and
   wherein an end of the bearing housing is on the same plane with said opposing surface or a portion of said bearing housing is positioned in said concave.

6. The direct-drive wind turbine generator according to claim 1, further comprising: a bearing housing which houses and supports said second bearing,
   wherein said torque support includes a torque support member connected to said bearing housing, and
   wherein said torque support member extend in a radial direction of said main shaft to connect said bearing housing and said stator casing.

7. A direct-drive wind turbine generator, comprising:
   a main shaft having one end connected to a rotor head of a wind turbine rotor;
   a generator having a stator, a stator casing for supporting said stator, and a rotor connected to the other end of said main shaft;
   first and second bearings positioned between said rotor head and said generator to rotatably support said main shaft;
   a torque support for supporting said stator casing; and
   a bearing housing which houses and supports said second bearing,
   wherein said second bearing is positioned closer to said generator than said first bearing and said second bearing includes
   first and second inner rings,
   first and second outer rings,
   first rolling elements provided between said first inner ring and said first outer ring,
   second rolling elements provided between said second inner ring and said second outer ring, and
   a biasing member,
   wherein a distance between said second outer ring and said second inner ring is variable, wherein said biasing member biases said second outer ring so that an inner face of said second outer ring comes close to an outer face of said second inner ring, wherein said first bearing is a bearing with an aligning capability, wherein said second bearing is a bearing with no aligning capability, wherein said stator casing includes
- a center plate opposed to said bearing housing, and
- an outer circumferential plate connected to an outer edge portion of said center plate, wherein said center plate is structured so that a center portion thereof is depressed with respect to said outer edge portion to provide a concave for said stator casing, wherein said outer circumferential plate is structured so that a protruding portion which protrudes from an outer edge of said concave in a radially inward direction of said main shaft to function as a torque support, wherein a part of said bearing housing is housed in said concave and said protruding portion is fitted into a groove provided for said bearing housing to connect said stator casing and said bearing housing, and wherein said second outer ring of said second bearing is movable with respect to said bearing housing by using a line contact or point contact.

8. The direct-drive wind turbine generator according to claim 7, wherein a spherical roller is inserted between said bearing housing and said second outer ring.

* * * * *